United States Patent
Yonge, III et al.

(10) Patent No.: US 9,521,090 B2
(45) Date of Patent: Dec. 13, 2016

(54) AUTHORIZING STATIONS INTO A CENTRALLY MANAGED NETWORK

(75) Inventors: Lawrence W. Yonge, III, Ocala, FL (US); Srinivas Katar, Gainesville, FL (US); Manjunath Krishnam, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 1082 days.

(21) Appl. No.: 11/970,297

(22) Filed: Jan. 7, 2008

(65) Prior Publication Data

US 2008/0298594 A1    Dec. 4, 2008

Related U.S. Application Data

(60) Provisional application No. 60/941,949, filed on Jun. 4, 2007.

(51) Int. Cl.
| | |
|---|---|
| *H04L 9/08* | (2006.01) |
| *H04L 12/915* | (2013.01) |
| *H04L 12/28* | (2006.01) |
| *H04L 12/721* | (2013.01) |
| *H04L 12/727* | (2013.01) |
| *H04L 12/733* | (2013.01) |
| *H04L 12/729* | (2013.01) |
| *H04L 12/761* | (2013.01) |
| *H04L 12/413* | (2006.01) |
| *H04L 12/44* | (2006.01) |

(52) U.S. Cl.
CPC ......... *H04L 47/787* (2013.01); *H04L 12/2801* (2013.01); *H04L 12/413* (2013.01); *H04L 45/12* (2013.01); *H04L 45/121* (2013.01); *H04L 45/122* (2013.01); *H04L 45/123* (2013.01); *H04L 45/125* (2013.01); *H04L 45/16* (2013.01); *H04B 2203/5445* (2013.01); *H04L 12/2856* (2013.01); *H04L 12/44* (2013.01)

(58) Field of Classification Search
CPC ............ H04L 9/0822; H04L 9/0891; H04L 2209/601; H04L 47/787
USPC ........................................... 380/278
See application file for complete search history.

(56) References Cited

U.S. PATENT DOCUMENTS

| | | |
|---|---|---|
| 4,578,530 A | 3/1986 | Zeidler |
| 4,689,786 A | 8/1987 | Sidhu et al. |

(Continued)

FOREIGN PATENT DOCUMENTS

| | | |
|---|---|---|
| EP | 1748574 | 1/2007 |
| EP | 1748597 A1 | 1/2007 |
| EP | 1179919 | 7/2010 |
| JP | 3107317 A | 5/1991 |
| JP | 2002135177 A | 5/2002 |
| JP | 2005073240 A | 3/2005 |
| WO | WO9634329 A1 | 10/1996 |

(Continued)

OTHER PUBLICATIONS

Co-pending U.S. Appl. No. 13/873,168, filed Apr. 29, 2013, 20 pages.

(Continued)

*Primary Examiner* — Krista Zele
*Assistant Examiner* — James Forman
(74) *Attorney, Agent, or Firm* — DeLizio Law, PLLC

(57) ABSTRACT

Systems and methods for connecting new stations to a secure network. New stations can send connection requests to a headend device. The headend device can retrieve a device access key associated with the new station and can provide a network membership key to the new station based upon authentication of the new station using the device access key.

25 Claims, 8 Drawing Sheets

(56) References Cited

U.S. PATENT DOCUMENTS

| | | | |
|---|---|---|---|
| 4,807,248 A | 2/1989 | Pyatt et al. | |
| 5,328,530 A | 7/1994 | Semiatin et al. | |
| 5,359,625 A | 10/1994 | Vander Mey et al. | |
| 5,491,750 A | 2/1996 | Bellare et al. | |
| 5,570,355 A | 10/1996 | Dail et al. | |
| 5,613,012 A | 3/1997 | Hoffman et al. | |
| 5,617,421 A | 4/1997 | Chin et al. | |
| 5,682,428 A | 10/1997 | Johnson | |
| 5,732,076 A | 3/1998 | Ketseoglou et al. | |
| 6,074,086 A | 6/2000 | Yonge, III | |
| 6,111,919 A | 8/2000 | Yonge, III | |
| 6,141,355 A | 10/2000 | Palmer et al. | |
| 6,167,137 A | 12/2000 | Marino et al. | |
| 6,173,400 B1 | 1/2001 | Perlman et al. | |
| 6,185,185 B1 | 2/2001 | Bass et al. | |
| 6,188,690 B1 | 2/2001 | Holden et al. | |
| 6,189,040 B1 | 2/2001 | Oohara | |
| 6,201,794 B1 | 3/2001 | Stewart et al. | |
| 6,243,761 B1 | 6/2001 | Mogul et al. | |
| 6,269,132 B1 | 7/2001 | Yonge, III | |
| 6,269,163 B1* | 7/2001 | Rivest et al. | 380/28 |
| 6,272,135 B1 | 8/2001 | Nakatsugawa | |
| 6,278,685 B1 | 8/2001 | Yonge, III | |
| 6,307,940 B1 | 10/2001 | Yamamoto | |
| 6,310,892 B1 | 10/2001 | Olkin | |
| 6,388,995 B1 | 5/2002 | Gai et al. | |
| 6,519,231 B1 | 2/2003 | Ding et al. | |
| 6,574,195 B2 | 6/2003 | Roberts | |
| 6,591,364 B1 | 7/2003 | Patel | |
| 6,606,303 B1 | 8/2003 | Hassel et al. | |
| 6,631,136 B1 | 10/2003 | Chowdhury et al. | |
| 6,711,163 B1 | 3/2004 | Reid et al. | |
| 6,775,656 B1 | 8/2004 | Gettwart et al. | |
| 6,804,252 B1 | 10/2004 | Johnson | |
| 6,904,462 B1 | 6/2005 | Sinha | |
| 6,910,136 B1 | 6/2005 | Wasserman et al. | |
| 7,039,021 B1 | 5/2006 | Kokudo | |
| 7,065,643 B1* | 6/2006 | Cornils et al. | 713/163 |
| 7,085,284 B1 | 8/2006 | Negus | |
| 7,089,298 B2 | 8/2006 | Nyman et al. | |
| 7,181,620 B1* | 2/2007 | Hur | 713/171 |
| 7,234,058 B1 | 6/2007 | Baugher et al. | |
| 7,346,021 B2 | 3/2008 | Yoshizawa et al. | |
| 7,350,076 B1 | 3/2008 | Young et al. | |
| 7,352,770 B1 | 4/2008 | Yonge, III | |
| 7,369,579 B2 | 5/2008 | Logvinov et al. | |
| 7,395,097 B2 | 7/2008 | Perdomo et al. | |
| 7,409,543 B1 | 8/2008 | Bjorn | |
| 7,496,039 B2 | 2/2009 | Yamada et al. | |
| 7,506,042 B2 | 3/2009 | Ayyagari | |
| 7,558,294 B2 | 7/2009 | Yonge, III | |
| 7,558,575 B2 | 7/2009 | Losh et al. | |
| 7,573,891 B1 | 8/2009 | Chow et al. | |
| 7,609,681 B2 | 10/2009 | Kurobe et al. | |
| 7,623,542 B2 | 11/2009 | Yonge, III et al. | |
| 7,668,191 B2 | 2/2010 | Steinback et al. | |
| 7,684,333 B1 | 3/2010 | Dasylva et al. | |
| 7,756,039 B2 | 7/2010 | Yonge, III | |
| 7,797,751 B1 | 9/2010 | Hughes et al. | |
| 7,804,842 B2 | 9/2010 | Malik et al. | |
| 7,826,475 B2 | 11/2010 | Lee et al. | |
| 7,826,618 B2 | 11/2010 | Klingler et al. | |
| 7,894,487 B2 | 2/2011 | Yonge, III | |
| 7,949,356 B2 | 5/2011 | Yonge, III | |
| 7,961,694 B1 | 6/2011 | Chan et al. | |
| 8,112,358 B2 | 2/2012 | Yonge, III | |
| 8,170,051 B2 | 5/2012 | Yonge, III | |
| 8,429,406 B2 | 4/2013 | Yonge, III et al. | |
| 8,467,369 B2 | 6/2013 | Yonge, III et al. | |
| 8,488,615 B2 | 7/2013 | Yonge, III et al. | |
| 8,503,480 B2 | 8/2013 | Yonge, III et al. | |
| 8,510,470 B2 | 8/2013 | Yonge, III et al. | |
| 8,989,379 B2 | 3/2015 | Katar et al. | |
| 2001/0000709 A1 | 5/2001 | Takahashi et al. | |
| 2002/0015496 A1 | 2/2002 | Weaver et al. | |
| 2002/0025810 A1 | 2/2002 | Takayama et al. | |
| 2002/0029260 A1 | 3/2002 | Dobbins et al. | |
| 2002/0060986 A1 | 5/2002 | Fukushima et al. | |
| 2002/0097679 A1 | 7/2002 | Berenbaum | |
| 2002/0107023 A1 | 8/2002 | Chari et al. | |
| 2002/0114303 A1 | 8/2002 | Crosbie et al. | |
| 2002/0122411 A1 | 9/2002 | Zimmerman et al. | |
| 2002/0124177 A1 | 9/2002 | Harper et al. | |
| 2002/0133622 A1 | 9/2002 | Pinto | |
| 2002/0137462 A1 | 9/2002 | Rankin | |
| 2002/0141417 A1 | 10/2002 | Umayabashi | |
| 2003/0012166 A1 | 1/2003 | Benveniste | |
| 2003/0018812 A1 | 1/2003 | Lakshminarayana et al. | |
| 2003/0048183 A1 | 3/2003 | Vollmer et al. | |
| 2003/0067892 A1 | 4/2003 | Beyer et al. | |
| 2003/0086437 A1 | 5/2003 | Benveniste | |
| 2003/0095551 A1 | 5/2003 | Gotoh et al. | |
| 2003/0137993 A1 | 7/2003 | Odman | |
| 2003/0193959 A1 | 10/2003 | Lui et al. | |
| 2003/0224784 A1 | 12/2003 | Hunt et al. | |
| 2003/0228846 A1 | 12/2003 | Berliner et al. | |
| 2003/0229783 A1 | 12/2003 | Hardt | |
| 2004/0047319 A1 | 3/2004 | Elg | |
| 2004/0070912 A1 | 4/2004 | Kopp | |
| 2004/0081089 A1 | 4/2004 | Ayyagari et al. | |
| 2004/0090982 A1 | 5/2004 | Xu | |
| 2004/0128310 A1 | 7/2004 | Zmudzinski et al. | |
| 2004/0165532 A1* | 8/2004 | Poor et al. | 370/238 |
| 2004/0174829 A1 | 9/2004 | Ayyagari | |
| 2004/0190542 A1 | 9/2004 | Ono et al. | |
| 2004/0210630 A1 | 10/2004 | Simonnet et al. | |
| 2004/0218577 A1 | 11/2004 | Nguyen et al. | |
| 2004/0234073 A1* | 11/2004 | Sato et al. | 380/28 |
| 2004/0240671 A1* | 12/2004 | Hu | H04W 12/04 380/277 |
| 2004/0264428 A1 | 12/2004 | Choi et al. | |
| 2005/0001694 A1* | 1/2005 | Berkman | 333/100 |
| 2005/0021539 A1 | 1/2005 | Short et al. | |
| 2005/0025176 A1 | 2/2005 | Ko et al. | |
| 2005/0068227 A1 | 3/2005 | Caspi et al. | |
| 2005/0071631 A1 | 3/2005 | Langer | |
| 2005/0089005 A1 | 4/2005 | Sakoda et al. | |
| 2005/0114489 A1 | 5/2005 | Yonge, III | |
| 2005/0117515 A1 | 6/2005 | Miyake | |
| 2005/0117750 A1 | 6/2005 | Rekimoto | |
| 2005/0135291 A1 | 6/2005 | Ketchum et al. | |
| 2005/0147075 A1 | 7/2005 | Terry | |
| 2005/0169222 A1 | 8/2005 | Ayyagari et al. | |
| 2005/0190785 A1 | 9/2005 | Yonge, III et al. | |
| 2005/0192037 A1 | 9/2005 | Nanda et al. | |
| 2005/0210157 A1 | 9/2005 | Sakoda | |
| 2005/0243765 A1 | 11/2005 | Schrader et al. | |
| 2005/0249186 A1 | 11/2005 | Kelsey et al. | |
| 2006/0002406 A1 | 1/2006 | Ishihara et al. | |
| 2006/0039371 A1 | 2/2006 | Castro et al. | |
| 2006/0053289 A1 | 3/2006 | Singh | |
| 2006/0072517 A1 | 4/2006 | Barrow et al. | |
| 2006/0077997 A1 | 4/2006 | Yamaguchi et al. | |
| 2006/0104301 A1 | 5/2006 | Beyer et al. | |
| 2006/0120371 A1 | 6/2006 | Huang et al. | |
| 2006/0159260 A1 | 7/2006 | Pereira et al. | |
| 2006/0168647 A1* | 7/2006 | Chiloyan | 726/4 |
| 2006/0209871 A1 | 9/2006 | Claret et al. | |
| 2006/0224813 A1 | 10/2006 | Rooholamini et al. | |
| 2006/0251017 A1 | 11/2006 | Bishop | |
| 2006/0251021 A1 | 11/2006 | Nakano et al. | |
| 2006/0251107 A1 | 11/2006 | Geren et al. | |
| 2006/0252378 A1 | 11/2006 | Bishop | |
| 2006/0256741 A1 | 11/2006 | Nozaki | |
| 2006/0268746 A1 | 11/2006 | Wijting et al. | |
| 2007/0004404 A1 | 1/2007 | Buckley et al. | |
| 2007/0019609 A1 | 1/2007 | Anjum | |
| 2007/0025244 A1 | 2/2007 | Ayyagari et al. | |
| 2007/0025384 A1 | 2/2007 | Ayyagari et al. | |
| 2007/0025391 A1 | 2/2007 | Yonge, III et al. | |
| 2007/0026794 A1 | 2/2007 | Ayyagari et al. | |
| 2007/0030811 A1 | 2/2007 | Frei et al. | |
| 2007/0053520 A1 | 3/2007 | Eckleder | |
| 2007/0058661 A1 | 3/2007 | Chow | |

(56) References Cited

U.S. PATENT DOCUMENTS

| | | |
|---|---|---|
| 2007/0058732 A1 | 3/2007 | Riedel et al. |
| 2007/0060141 A1 | 3/2007 | Kangude et al. |
| 2007/0097867 A1 | 5/2007 | Kneckt et al. |
| 2007/0115973 A1 | 5/2007 | Koga et al. |
| 2007/0118730 A1* | 5/2007 | Platt ................................ 713/2 |
| 2007/0133388 A1 | 6/2007 | Lee et al. |
| 2007/0133449 A1 | 6/2007 | Schacht et al. |
| 2007/0140185 A1 | 6/2007 | Garg et al. |
| 2007/0147322 A1 | 6/2007 | Agrawal et al. |
| 2007/0183445 A1 | 8/2007 | Kim et al. |
| 2007/0189189 A1 | 8/2007 | Andrews et al. |
| 2007/0220570 A1 | 9/2007 | Dawson et al. |
| 2007/0254596 A1 | 11/2007 | Corson et al. |
| 2007/0271398 A1 | 11/2007 | Manchester et al. |
| 2007/0286074 A1 | 12/2007 | Xu |
| 2007/0286111 A1 | 12/2007 | Corson et al. |
| 2008/0002599 A1 | 1/2008 | Yau et al. |
| 2008/0151820 A1 | 6/2008 | Solis et al. |
| 2008/0178003 A1* | 7/2008 | Eastham et al. .............. 713/171 |
| 2008/0181219 A1 | 7/2008 | Chen et al. |
| 2008/0186230 A1 | 8/2008 | Wengler et al. |
| 2008/0192666 A1 | 8/2008 | Koskan et al. |
| 2008/0212591 A1 | 9/2008 | Wu et al. |
| 2008/0222447 A1 | 9/2008 | Ram et al. |
| 2008/0225774 A1 | 9/2008 | Kim et al. |
| 2008/0247408 A1 | 10/2008 | Yoon et al. |
| 2008/0267106 A1 | 10/2008 | Buddhikot et al. |
| 2008/0279126 A1 | 11/2008 | Katar et al. |
| 2008/0279204 A1 | 11/2008 | Pratt, Jr. et al. |
| 2008/0298252 A1 | 12/2008 | Yonge, III |
| 2008/0298589 A1 | 12/2008 | Katar et al. |
| 2008/0298590 A1 | 12/2008 | Katar et al. |
| 2008/0301052 A1 | 12/2008 | Yonge, III |
| 2008/0301446 A1 | 12/2008 | Yonge, III |
| 2008/0310414 A1 | 12/2008 | Yonge, III |
| 2009/0010276 A1 | 1/2009 | Yonge, III |
| 2009/0034552 A1 | 2/2009 | Yonge, III |
| 2009/0040930 A1 | 2/2009 | Yonge, III |
| 2009/0067389 A1 | 3/2009 | Lee et al. |
| 2009/0074007 A1 | 3/2009 | Yonge, III |
| 2009/0092075 A1 | 4/2009 | Corson et al. |
| 2009/0097443 A1 | 4/2009 | Pasanen et al. |
| 2009/0106551 A1* | 4/2009 | Boren et al. ................... 713/158 |
| 2009/0116461 A1 | 5/2009 | Yonge, III |
| 2009/0119190 A1* | 5/2009 | Realini ........................... 705/30 |
| 2009/0147714 A1 | 6/2009 | Jain |
| 2009/0154487 A1 | 6/2009 | Ryan et al. |
| 2009/0207769 A1 | 8/2009 | Park et al. |
| 2009/0311963 A1 | 12/2009 | Haverty |
| 2010/0014444 A1 | 1/2010 | Ghanadan et al. |
| 2010/0091760 A1 | 4/2010 | Yoon |
| 2010/0100724 A1 | 4/2010 | Kaliski, Jr. |
| 2010/0161972 A1* | 6/2010 | Staring et al. ................ 713/158 |
| 2012/0072715 A1 | 3/2012 | Yonge, III |
| 2013/0235730 A1 | 9/2013 | Yonge, III et al. |
| 2013/0272315 A1 | 10/2013 | Yonge, III et al. |
| 2013/0287041 A1 | 10/2013 | Yonge, III et al. |

FOREIGN PATENT DOCUMENTS

| | | |
|---|---|---|
| WO | WO9857439 A1 | 12/1998 |
| WO | WO02103943 A1 | 12/2002 |
| WO | 03010096 | 2/2003 |
| WO | WO03100996 A2 | 12/2003 |
| WO | WO2004038980 A2 | 5/2004 |

OTHER PUBLICATIONS

Co-pending U.S. Appl. No. 13/917,394, filed Jun. 13, 2013, 34 pages.
Co-pending U.S. Appl. No. 13/933,924, filed Jul. 2, 2013, 36 pages.
"U.S. Appl. No. 11/970,339 Office Action", Jun. 27, 2013, 22 pages.
"U.S. Appl. No. 13/113,474 Office Action", Jun. 17, 2013, 10 pages.
"U.S. Appl. No. 121133,301 Office Action", Sep. 25, 2013, 44 pages.
Afkhamie et al., "An Overview of the upcoming HomePlug AV Standard", May 2005, IEEE 0-7803-8844-5/05, pp. 400-404.
Co-pending U.S. Appl. No. 13/113,474, filed May 23, 2011, 32 pages.
European Search Report—EP09178487, Search Authority, Munich Patent Office, Jan. 21, 2010.
Faure, Jean-Philippe et al., Call for Submissions. Draft Standard for Broadband over Power Line Networks: Medium Access Control and Physical Layer Specifications. Feb. 14, 2007, 4 pages.
Faure, Jean-Philippe et al., Coexistence/interoperability Cluster, FTR SG Requirements. Draft Standard for Broadband over Power Line Networks: Medium Access Control and Physical Layer Specifications. Feb. 5, 2007, 13 pages.
HomePlug Powerline Alliance Inc., "HomePlug AV White Paper," Doc. Ver. No. HPAVWP-050818, Aug. 2005, pp. 1-11.
International Search Report and Written Opinion—PCT/US2008/065811, International Searching Authority, European Patent Office, Nov. 25, 2008.
International Search Report and Written Opinion—PCT/US2008/065831, International Searching Authority, European Patent Office, Feb. 20, 2009, 22 pages.
Katar et al., "Beacon Schedule Persistence to Mitigate Beacon Loss in HomePlug AV Networks," May 2006, IEEE 1-4244-0113-05/06, pp. 184-188.
Lee et al., "HomePlug 1.0 Powerline Communication LANs-Protocol Description and Performance Results version 5.4," 2000, International Journal of Communication Systems, 2000 00: 1-6, pp. 1-25.
Loh et al, Quality of Support and priority Management in HomePNA 2.0 Link Layer, IEEE, 6 pages, 2003.
Notification of First Office Action, The State Intellectual Property Office of the People's Republic of China, issued in Chinese Application No. 200610107587.1, dated Oct. 11, 2010, 6 pages.
Notification of Reasons for Rejection, Japanese Patent Office, issued in Japanese Patent Application No. 2006-205200, dated Jan. 18, 2011, 3 pages.
Opera Specification—Part 1: Technology, Open PLC European Research Alliance, 198 pages, 1006.
"U.S. Appl. No. 11/970,271 Final Office Action", Jul. 19, 2011, 21 pages.
"U.S. Appl. No. 11/970,271 Office Action", Mar. 9, 2012, 19 pages.
"U.S. Appl. No. 11/970,271 Office Action", Oct. 7, 2011, 20 pages.
"U.S. Appl. No. 11/970,271 Office Action", Dec. 7, 2010, 21 pages.
"U.S. Appl. No. 11/970,297 Office Action", Mar. 30, 2011, 30 pages.
"U.S. Appl. No. 11/970,297 Office Action", Sep. 29, 2011, 31 pages.
"U.S. Appl. No. 11/970,323 Office Action", Dec. 7, 2010, 12 pages.
"U.S. Appl. No. 11/970,339 Final Office Action", Jul. 7, 2011, 14 pages.
"U.S. Appl. No. 11/970,339 Office Action", Jan. 19, 2011, 22 pages.
"U.S. Appl. No. 11/971,446 Office Action", Feb. 15, 2011, 20 pages.
"U.S. Appl. No. 11/971,446 Final Office Action", Jul. 1, 2011, 17 pages.
"U.S. Appl. No. 12/108,334 Final Office Action", Jun. 14, 2011, 28 pages.
"U.S. Appl. No. 12/108,334 Office Action", Feb. 16, 2011, 26 pages.
"U.S. Appl. No. 12/108,334 Office Action", Aug. 3, 2010, 20 pages.
"U.S. Appl. No. 12/133,270 Final Office Action", Nov. 18, 2011, 23 pages.
"U.S. Appl. No. 12/133,270 Office Action", Jun. 3, 2011, 67 pages.
"U.S. Appl. No. 12/133,301 Office Action", Mar. 1, 2012, 38 pages.
"U.S. Appl. No. 12/133,312 Final Office Action", Feb. 16, 2011, 24 pages.
"U.S. Appl. No. 12/133,312 Office Action", Jun. 8, 2011, 24 pages.
"U.S. Appl. No. 12/133,312 Office Action", Jul. 28, 2010, 29 pages.
"U.S. Appl. No. 12/133,315 Final Office Action", Jun. 9, 2011, 38 pages.
"U.S. Appl. No. 12/133,315 Final Office Action", Jul. 20, 2010, 30 pages.

(56) References Cited

OTHER PUBLICATIONS

"U.S. Appl. No. 12/133,315 Office Action", Dec. 24, 2009, 28 pages.
"U.S. Appl. No. 12/133,315 Office Action", Dec. 28, 2010, 36 pages.
"U.S. Appl. No. 12/133,325 Final Office Action", Dec. 9, 2010, 33 pages.
"U.S. Appl. No. 12/133,325 Office Action", May 27, 2010, 31 pages.
"U.S. Appl. No. 12/133,301 Office Action", Sep. 22, 2010, 42 pages.
"U.S. Appl. No. 12/133,301 Final Office Action", Mar. 22, 2011, 39 pages.
"U.S. Appl. No. 11/970,339 Office Action", Jun. 18, 2012, 26 pages.
"U.S. Appl. No. 12/108,334 Office Action", Aug. 3, 2012, 18 pages.
"U.S. Appl. No. 12/133,315 Office Action", Aug. 9, 2012, 37 pages.
U.S. Appl. No. 11/970,339 Final Office Action, Jan. 3, 2014, 27 pages.
U.S. Appl. No. 11/971,446 Office Action, Feb. 14, 2014, 19 pages.
U.S. Appl. No. 13/873,168 Office Action, Dec. 16, 2013, 23 pages.
U.S. Appl. No. 12/133,301 Final Office Action, 28 pages, Apr. 17, 2014.
U.S. Appl. No. 13/873,168 Final Office Action, Jun. 11, 2014, 22 pages.
U.S. Appl. No. 11/970,339 Office Action, May 22, 2014, 18 pages.
Notification of First Office Action, The State Intellectual Property Office of the People's Republic of China, issued in Chinese Application No. 200880100486.9, Nov. 21, 2012, 17 pages.
U.S. Appl. No. 13/303,913 Office Action, Dec. 26, 2012, 37 pages.
U.S. Appl. No. 11/970,339 Final Office Action, Dec. 11, 2012, 25 pages.
Muir A., et al., "An Efficient Packet Sensing MAC Protocol for Wireless Networks", Computer Engineering Department School of Engineering, University of California, Aug. 1998, pp. 20.
U.S. Appl. No. 12/133,301 Final Office Action, Sep. 26, 2012, 54 pages.
"U.S. Appl. No. 11/971,446 Final Office Action", Aug. 27, 2014, 21 pages.
"U.S. Appl. No. 12/133,301 Office Action", Oct. 2, 2014, 34 pages.
"U.S. Appl. No. 13/303,913 Final Office Action", Sep. 16, 2014, 8 pages.
"U.S. Appl. No. 11/970,339 Final Office Action", Nov. 6, 2014, 24 pages.
"U.S. Appl. No. 13/917,394 Office Action", Oct. 17, 2014, 49 Pages.
"U.S. Appl. No. 12/133,301 Final Office Action", Mar. 16, 2015, 36 pages.
"U.S. Appl. No. 13/917,394 Final Office Action", Feb. 23, 2015, 54 pages.
"U.S. Appl. No. 11/970,339 Office Action", Oct. 15, 2015, 24 pages.
"U.S. Appl. No. 12/133,301 Office Action", Jul. 1, 2015, 37 pages.
"U.S. Appl. No. 13/933,924 Final Office Action", Nov. 10, 2015, 21 pages.
"U.S. Appl. No. 13/933,924 Office Action", Jun. 12, 2015, 18 pages.
"U.S. Appl. No. 12/133,301 Final Office Action", Feb. 5, 2016, 45 pages.

* cited by examiner

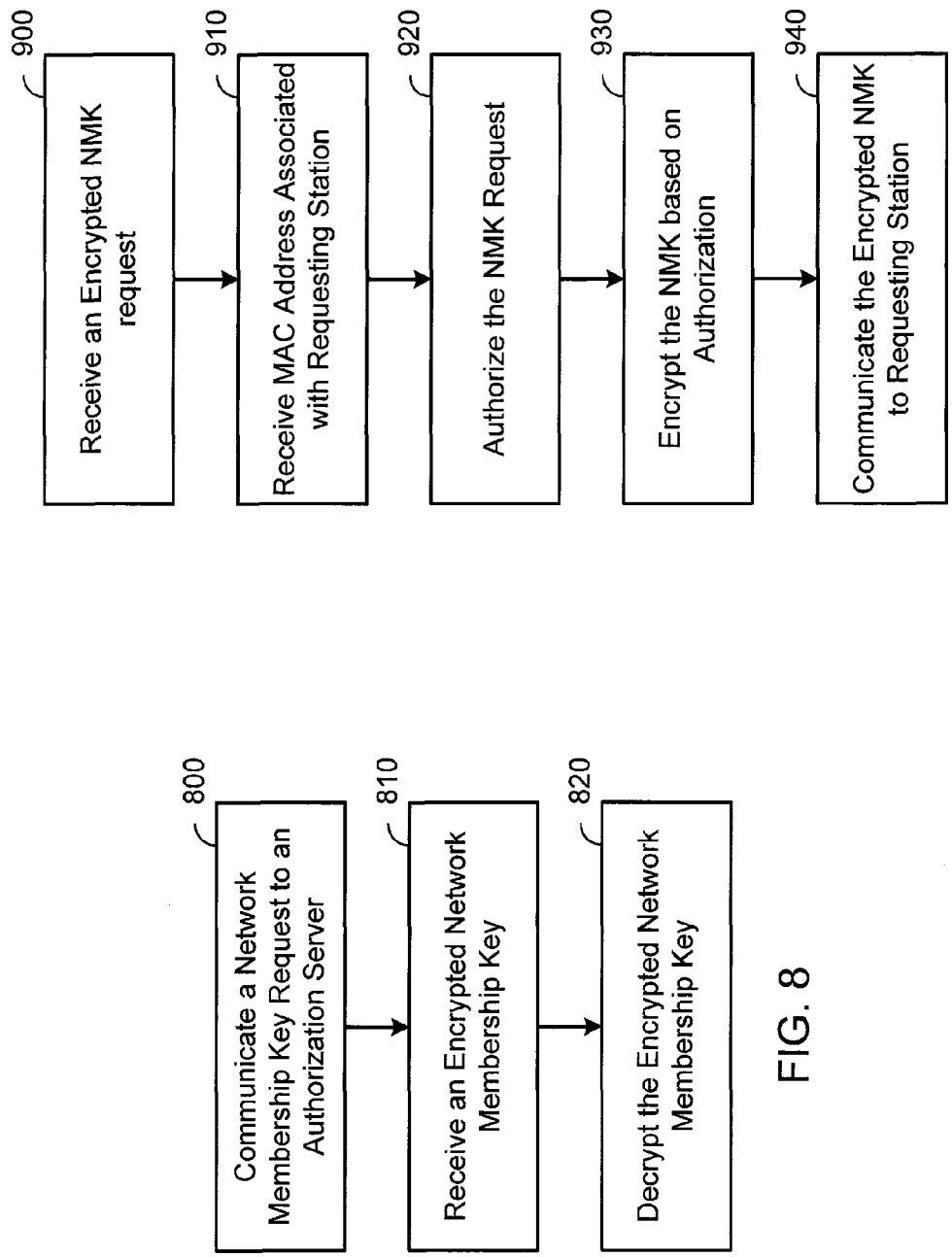

AUTHORIZING STATIONS INTO A CENTRALLY MANAGED NETWORK

RELATED APPLICATIONS

This application is a utility of U.S. Provisional Application Ser. No. 60/941,949, entitled "MANAGING COMMUNICATIONS OVER A SHARED MEDIUM," filed on Jun. 4, 2007, which is hereby incorporated by reference.

TECHNICAL FIELD

The invention relates to authorizing stations into a centrally managed network.

BACKGROUND

A network of communication stations can share a communication medium (e.g., wires connecting multiple stations or spectrum for transmitting radio signals among stations) using any of a variety of access techniques. Security for a shared communication medium network can be difficult since there is no protection from others connecting unauthorized devices to the network. For example, when a new station is deployed, the new station should be able to easily join the network, while unauthorized stations should be inhibited from joining the network. While an encryption key can provide some security, the distribution of the encryption key can be difficult because communication of the keys can provide opportunity to compromise the encryption key.

SUMMARY

The following are various aspects described herein. In one aspect computer implemented authentication methods are disclosed. Such method can include: generating a network membership key request; communicating the network membership key request to an authorization server, the network membership key request including a unique identifier associated with the requesting station, the unique identifier being unencrypted; receiving the network membership key based on the network membership key request; wherein the network membership key is received in encrypted format based upon a device access key; and, wherein the network membership key is received based upon a stored device access key associated with the unique identifier matching the device access key used to encrypt the network membership key request.

Methods for authorization can include: receiving an encrypted network membership key request from a station; receiving an unencrypted unique identifier associated with the encrypted network membership key request; determining whether the encrypted network membership key request is authentic based upon the unique identifier; encrypting a network membership key using a device access key associated with the station; and, communicating the encrypted network membership key to the station.

Authentication systems can include a number of stations and an authorization server. The stations can generate an encrypted network membership key request, the encrypted network membership key requests including unencrypted identifiers respectively associated with the station generating the encrypted network membership key request. The authorization server can receive the encrypted network membership key requests and identify stored device access keys based upon the unique identifiers respectively associated with each of the network membership key requests. The authorization server can authenticate the station based upon successful decryption of the network membership key requests based on the stored device access keys respectively associated with each of the unique identifiers and can encrypt a network membership key using the device access key and communicate the encrypted network membership key to the stations based upon authenticating the station.

Other aspects will be found in the detailed description, drawings and claims.

DESCRIPTION OF DRAWINGS

FIGS. 8 and 9 are flowcharts illustrating example methods for authorizing a station into a network.

DETAILED DESCRIPTION

There are a many possible implementations of the invention, some example implementations are described below. However, such examples are descriptions of various implementations, and not descriptions of the invention, which is not limited to the detailed implementations described in this section but is described in broader terms in the claims.

Figure 1:
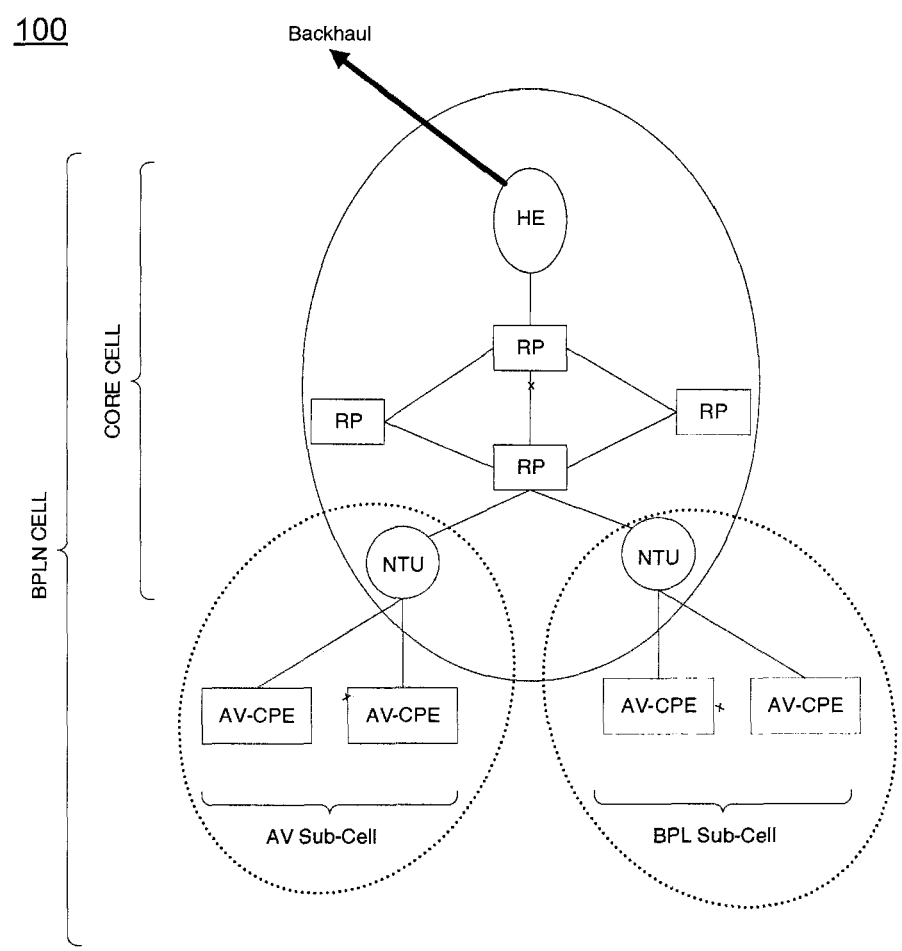
FIG. 1 is a schematic diagram of a communication network.

FIG. 1 shows an exemplary network configuration for an access network 100 such as a broadband power line Network (BPLN) that provides access to a backhaul network. The BPLN can be managed by a service provider entity having access to the underlying physical power line medium. BPLN is a general purpose network that can be used for several types of applications including, smart grid management, broadband internet access, voice and video delivery services, etc. In various implementations, BPLN can be deployed on low voltage, medium voltage and high voltage power lines. Additionally, BPLN can span an entire neighborhood or it may be deployed within a single multi-dwelling unit. For example, it can be used to provide network service to tenants in a single apartment building. While power lines are one medium for deploying the BPLN, similar techniques can be deployed on other wire lines, such as, for example, coaxial cables, twisted pair or a combination thereof.

A BPLN can include one or more cells. A cell is a group of broadband power line (BPL) devices in a BPLN that have similar characteristics such as association management, security, QoS and channel access settings, for example. Cells in a BPLN are logically isolated from each other, and communication to and from the backhaul occurs within the cell. Each cell in a BPLN includes a core-cell and may also include one or more sub-cells. There can be more than one cell on a given physical power line medium.

A core-cell includes a group of devices in a BPLN that includes a head end (HE), repeaters (R), and network termination units (NTU), but can exclude customer premise equipment (CPE). The head end (HE) is a device that bridges a cell to the backhaul network. At a given time, a cell will have one active head end and the head end manages the cell including the core-cell and any associated sub-cells. A repeater (RP) is a device that selectively retransmits media access control (MAC) service data units (MSDUs) to extend the effective range and bandwidth of the BPLN cell. Repeaters can also perform routing and quality of service (QoS) functions. The NTU is a device that connects a BPLN cell to the end users' network or devices. The NTU may in some cases bridge to other network technologies such as WiFi. A single NTU can serve more than one customer. Each Sub-Cell is associated with an active NTU. In some implementations, an HE, an NTU and/or an RP can be co-located at a single station. Thus, a single device may be designed to perform multiple functions. For example, a single device can simultaneously be programmed to perform the tasks associated with an RP and an NTU.

In some aspects, a sub-cell can be an AV sub-cell. An sub-cell is an extension of the BPLN cell that is based on the AV protocol and provides for the connection of multiple CPE-AVs to a BPLN cell via an NTU. The links from the NTU to the set of CPE-AV(s) at a customer location can use different network membership keys and/or network encryption keys. The NTU of an AV Sub-Cell can operate as its Central Coordinator (CCo). A BPL sub-cell is an extension of a BPLN cell that is based on the BPL protocol and provides for the connection of multiple CPE-BPL(s) to the BPLN Cell via an NTU. The links from the NTU to the set of CPE-BPL(s) at a customer location can use different network membership keys and/or network encryption keys.

Various types of CPE devices (e.g., a computer) can be used as endpoint nodes in the network and such devices can communicate with other nodes in the network through the NTU.

Various types of CPE devices (e.g., a computer) can be used as endpoint nodes in the network and such devices can communicate with other nodes in the network through the NTU, any number of repeaters (e.g., including no repeaters), and the head end.

Each node in the network communicates as a communication "station" (STA) using a PHY layer protocol that is used by the nodes to send transmissions to any other stations that are close enough to successfully receive the transmissions. STAs that cannot directly communicate with each other use one or more repeater STAs to communicate with each other. Any of a variety of communication system architectures can be used to implement the portion of the network interface module that converts data to and from a signal waveform that is transmitted over the communication medium. An application running on a station can provide data to and receives data from the network interface module. A MSDU is a segment of information received by the MAC layer. The MAC layer can process the received MSDUs and prepares them to generate "MAC protocol data units" (MPDUs). A MPDU is a segment of information including header and payload fields that the MAC layer has asked the PHY layer to transport. An MPDU can have any of a variety of formats based on the type of data being transmitted. A "PHY protocol data unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the powerline medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques like Orthogonal Frequency Division Multiplexing (OFDM), Wavelet modulations can be used. Forward error correction (FEC) code line Viterbi codes, Reed-Solomon codes, concatenated code, turbo codes, low density parity check code, etc., can be employed by the PHY to overcome errors. A preferred implementation of the MAC and PHY layers used by powerline medium is that based on HomePlug AV specification.

One implementation of the PHY layers is to use OFDM modulation. In OFDM modulation, data are transmitted in the form of OFDM "symbols." Each symbol has a predetermined time duration or symbol time Ts. Each symbol is generated from a superposition of N sinusoidal carrier waveforms that are orthogonal to each other and form the OFDM carriers. Each carrier has a peak frequency fi and a phase φi measured from the beginning of the symbol. For each of these mutually orthogonal carriers, a whole number of periods of the sinusoidal waveform is contained within the symbol time Ts. Equivalently, each carrier frequency is an integral multiple of a frequency interval Δf =1/Ts. The phases Φi and amplitudes Ai of the carrier waveforms can be independently selected (according to an appropriate modulation scheme) without affecting the orthogonality of the resulting modulated waveforms. The carriers occupy a frequency range between frequencies f1 and fN referred to as the OFDM bandwidth.

Figure 2:
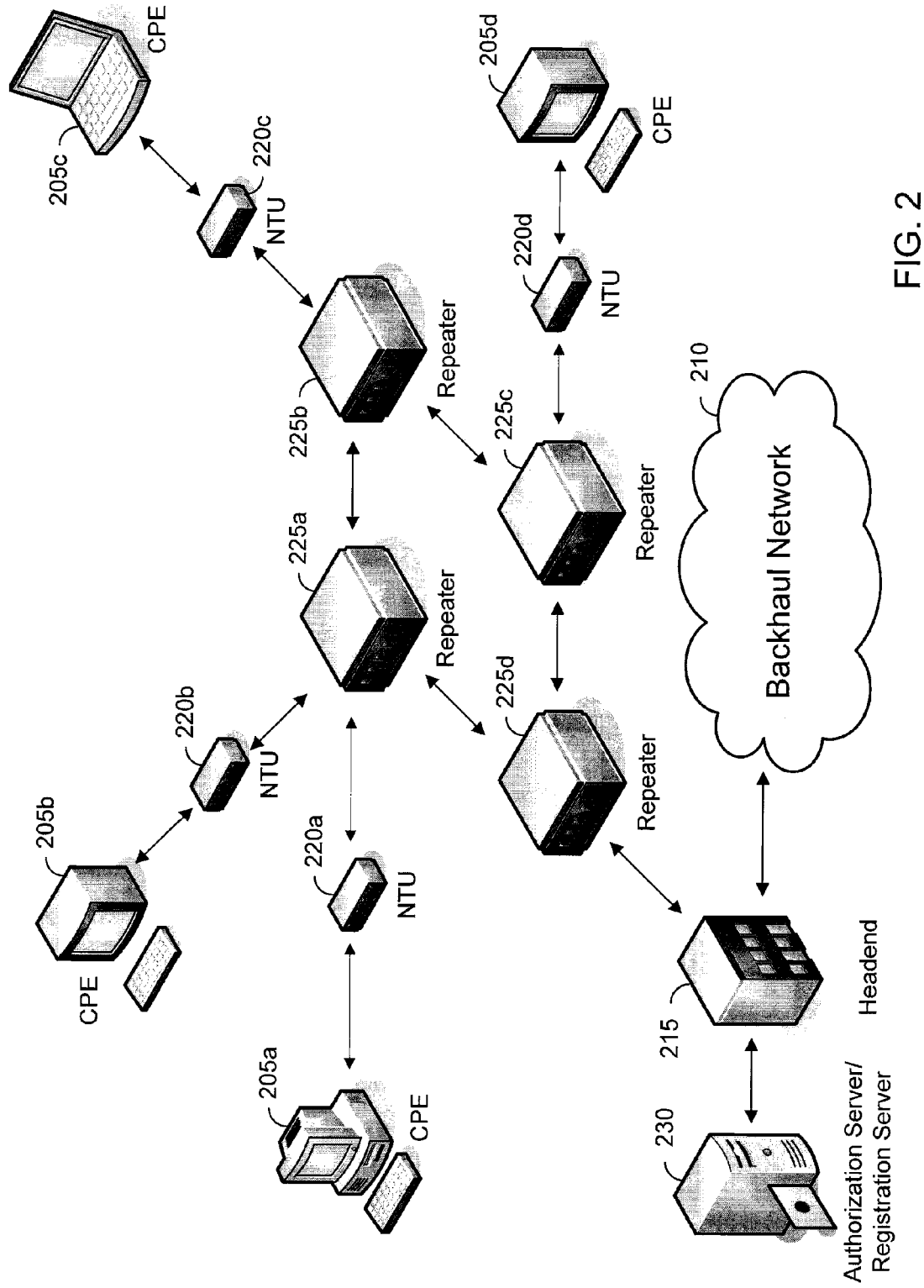
FIG. 2 is a block diagram of a powerline communication network.

FIG. 2 is a block diagram of a powerline communication network. In various implementations, a powerline communication network can enable customer premises equipment (CPE) devices 205*a-d* to access a backhaul network 210 through a gateway (e.g., a headend 215). In various implementations, there can be multiple gateways to the backhaul network 210. For example, it can be inefficient for a CPE device in one city to be required to send a signal to another city prior to accessing the backhaul network 210 (e.g., the Internet).

The CPE devices 205*a-d* can communicate with the headend 215 through a network of network termination units 220*a-d* and repeaters 225*a-d*. In some implementations, the network termination units can operate to translate the data signals from the CPE devices in any of a variety of communications protocols onto a powerline network. For example, a CPE 205*a-d* might communicate with an NTU 220*a-d* using a IEEE 802.11 wireless protocol, and the NTU 220*a-d* can convert the wireless signal to a signal suitable for transmission on a powerline medium. Systems for transmitting and receiving powerline network signals are further described in FIG. 3.

In various implementations, repeaters 225*a-d* can be located throughout the powerline network to provide the ability for a data signal to travel on the powerline carrier medium over long distances. As discussed above, the headend 215 can provide a gateway for the data signal to be transferred to a backhaul network 210. For example, the headend 215 can extract the data signal from the powerline network and convert the signal for transmission on a packet switched network such as the Internet. In various implementations, one or more of the repeaters 225a-d can be equipped to transfer the signal from the powerline network to the backhaul network 210.

In some implementations, the headend 215 can also include an authorization server. In one implementation, the authorization server is included on the backhaul network 210. The authorization server can be operable to authorize CPE devices 205a-d for transmission of data over the powerline network. When a CPE device 205a-d is not authorized, in various implementations, the CPE device 205a-d can be provided access to a registration server 230. The registration server 230, in various implementations, can enable the user of a CPE device 205a-d to register the CPE device 205a-d with the network to obtain access to the powerline network.

In various implementations, the registration server 230 can provide a limited registration to a CPE device 205a-d to try the powerline network. For example, the registration can be limited by a period of time, bandwidth, destination address, or any other limitation that might allow the user to have limited access to the network. In additional implementations, the registration server 230 can require payment prior to using the network. For example, the registration server can provide web pages operable to collect payment information from the user. In various implementations, the registration server can allow the user to pay for any of a variety of different access plans. For example, an access plan might allow a user to purchase access for a specified period of time, at a specified bandwidth, or combinations thereof. In some implementations, the registration server and authorization server can be co-located as shown in FIG. 2. In additional implementations, the registration server can be part of the backhaul network 201. In still further implementations, the registration server is not co-located with the authorization server.

Figure 3:
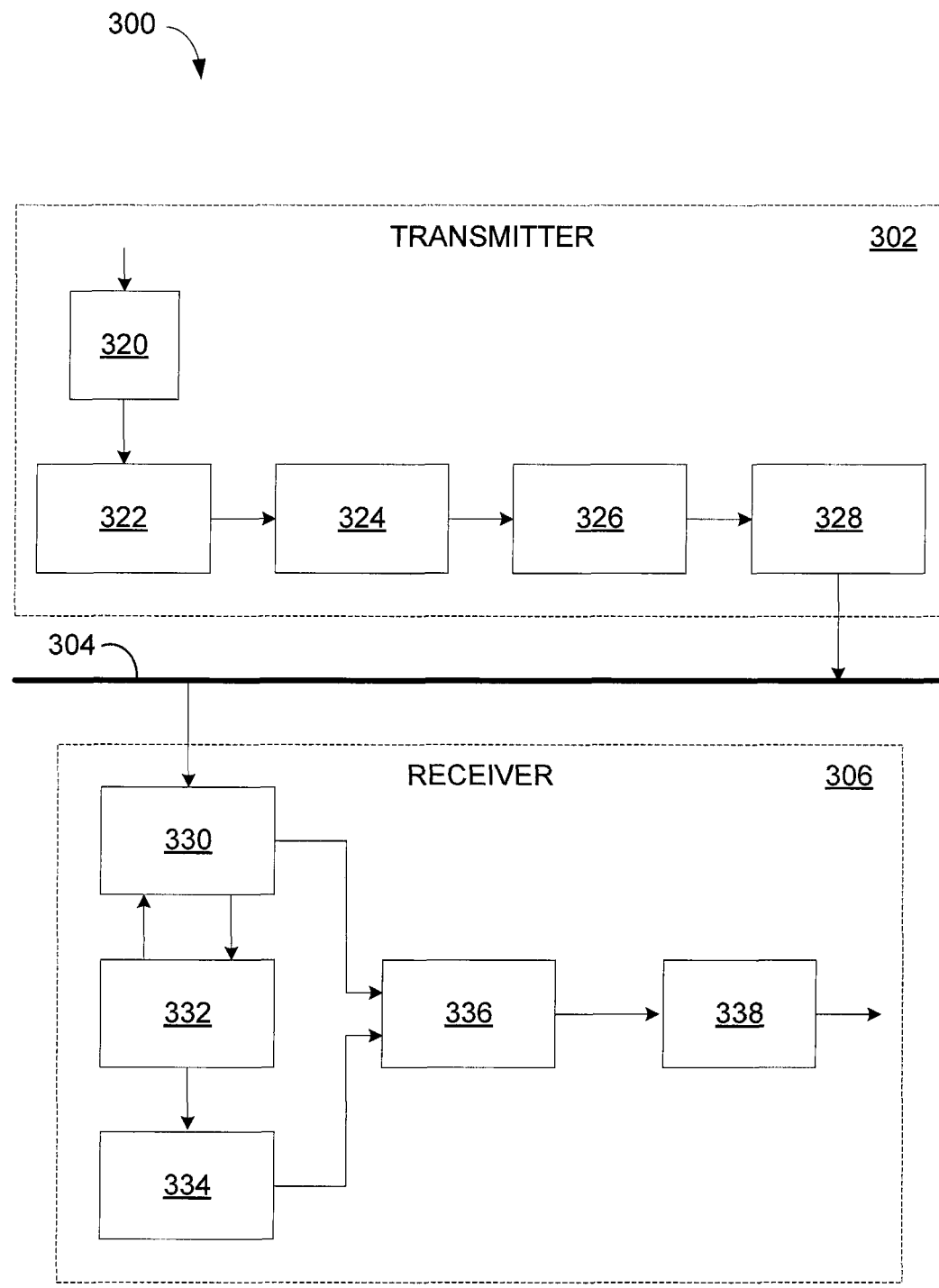
FIG. 3 is a block diagram of a communication system for communicating over a powerline network.

Referring to FIG. 3, a communication system 300 includes a transmitter 302 for transmitting a signal (e.g., a sequence of OFDM symbols) over a communication medium 304 to a receiver 306. The transmitter 302 and receiver 306 can both be incorporated into a network interface module at each station. The communication medium 304 can represent a path from one device to another over the power line network.

At the transmitter 302, modules implementing the PHY layer receive an MPDU from the MAC layer. The MPDU is sent to an encoder module 320 to perform processing such as scrambling, error correction coding and interleaving.

The encoded data is fed into a mapping module 322 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 322 also determines which of the carrier frequencies $f_1, \ldots, f_N$ within the OFDM bandwidth are used by the system 300 to transmit information. For example, some carriers that are experiencing fades can be avoided, and no information is transmitted on those carriers. Instead, the mapping module 322 uses coherent BPSK modulated with a binary value from the Pseudo Noise (PN) sequence for that carrier. For some carriers (e.g., a carrier i=10) that correspond to restricted bands (e.g., an amateur radio band) on a medium 304 that may radiate power no energy is transmitted on those carriers (e.g., $A_{10}=0$). The mapping module 322 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 324 performs the modulation of the resulting set of N complex numbers (some of which may be zero for unused carriers) determined by the mapping module 322 onto N orthogonal carrier waveforms having peak frequencies $f_1, \ldots, f_N$. The modulated carriers are combined by IDFT module 324 to form a discrete time symbol waveform S(n) (for a sampling rate $f_R$), which can be written as $$S(n) = \sum_{i=1}^{N} A_i \exp[j(2\pi i n / N + \Phi_i)] \quad \text{Eq. (1)}$$

where the time index n goes from 1 to N, Ai is the amplitude and $\phi_i$ is the phase of the carrier with peak frequency $f_i = (i/N)f_R$, and $j=\sqrt{-1}$. In some implementations, the discrete Fourier transform corresponds to a fast Fourier transform (FFT) in which N is a power of 2.

A post-processing module 326 combines a sequence of consecutive (potentially overlapping) symbols into a "symbol set" that can be transmitted as a continuous block over the communication medium 304. The post-processing module 326 prepends a preamble to the symbol set that can be used for automatic gain control (AGC) and symbol timing synchronization. To mitigate intersymbol and intercarrier interference (e.g., due to imperfections in the system 300 and/or the communication medium 304) the post-processing module 326 can extend each symbol with a cyclic prefix that is a copy of the last part of the symbol. The post-processing module 326 can also perform other functions such as applying a pulse shaping window to subsets of symbols within the symbol set (e.g., using a raised cosine window or other type of pulse shaping window) and overlapping the symbol subsets.

An Analog Front End (AFE) module 328 couples an analog signal containing a continuous-time (e.g., low-pass filtered) version of the symbol set to the communication medium 304. The effect of the transmission of the continuous-time version of the waveform S(t) over the communication medium 304 can be represented by convolution with a function $g(\tau;t)$ representing an impulse response of transmission over the communication medium. The communication medium 304 may add noise n(t), which may be random noise and/or narrowband noise emitted by a jammer.

At the receiver 306, modules implementing the PHY layer receive a signal from the communication medium 304 and generate an MPDU for the MAC layer. An AFE module 330 operates in conjunction with an Automatic Gain Control (AGC) module 332 and a time synchronization module 334 to provide sampled signal data and timing information to a discrete Fourier transform (DFT) module 336.

After removing the cyclic prefix, the receiver 306 feeds the sampled discrete-time symbols into DFT module 336 to extract the sequence of N complex numbers representing the encoded data values (by performing an N-point DFT).

Demodulator/Decoder module 338 maps the complex numbers onto the corresponding bit sequences and performs the appropriate decoding of the bits (including de-interleaving and descrambling).

Any of the modules of the communication system 300 including modules in the transmitter 302 or receiver 306 can be implemented in hardware, software, or a combination of hardware and software.

Figure 4:
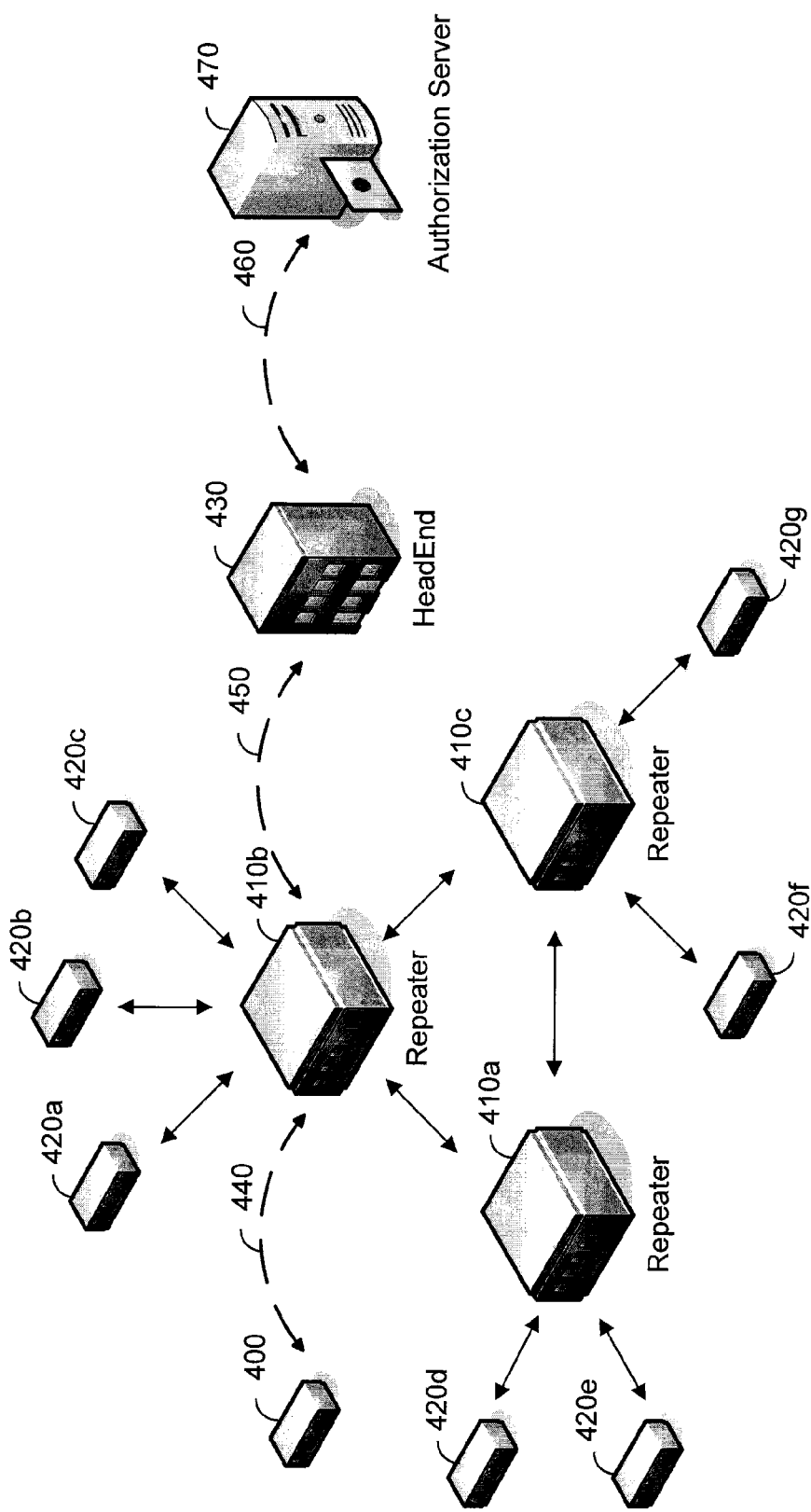
FIG. 4 is a block diagram illustrating a process for authorizing a new network termination unit into a network.

FIG. 4 is a block diagram illustrating a process for authorizing a new network termination unit (NTU) 400 into a network. The powerline network, in various implementations, can include a number of repeaters 410a-c and NTUs 420a-g. The NTUs 420a-g can communicate with a headend 430 through the repeaters 410a-c. The repeaters 410a-c can help to restore losses in the signals over spans in the network prior to the signal reaching a headend 430. The headend 430 can provide a gateway to a backhaul network.

In various implementations, new devices can be added to the powerline network. For example, in FIG. 4, new NTU device 400 is added to the network. Upon connection, the new NTU device 400 can send a connection request 440 to a repeater 410b. The repeater 410b can determine that the device is new. In some implementations, the repeater 410b can determine that the device is new based upon being unable to recognize the connection request. For example, the connection request 440 can be encrypted by the new device 400 using a device access key (DAK) associated with the new device 400. If the device has not previously been associated with the repeater, the repeater is unable to decrypt the encrypted connection request received from the new NTU device 400. The repeater 410b can forward the connection request 450 to the headend 430.

In various implementations, the DAK associated with the device can be substantially unique. For example, in such implementations, the DAK associated with a device can be randomly generated. Random generation of the DAK causes multiple use of the same DAK improbable. In some implementations, a randomly generated DAK can be tested against previously generated DAKs to ensure that the generated DAK is unique.

In various implementations, the headend 430 can extract an identifier (e.g., a media access control (MAC) address) associated with the request and identify a device access key (DAK) associated with the device by querying 460 authorization server 470. In various implementations, the authorization server 470 can include the MAC/DAK of devices authorized to access the network and can provide the DAK when requested by the headend 430. For example, when a new device 400 is deployed, the MAC address associated with the device 400, along with the DAK associated with the device 400 can be stored at the authorization server 470. Such data can substitute for a username/password combination for the new device 400. The connection request can be decrypted using the DAK associated with the extracted MAC address. In such implementations, when the DAK associated with the MAC address of the device is operable to decrypt the connection request, the new NTU device 400 can be authorized to connect to the network. The headend 430 can notify one or more repeaters 410a-c that the NTU device 400 is authorized to join the network. The NTU device 400 can then be associated with one or more repeater devices 410a-c. The headend 430 can respond to the connection request by encrypting a network membership key (NMK) using the DAK associated with the new NTU 400. The new NTU 400 can thereby decrypt the NMK using it's own DAK. In some implementations, the NMK can be a unique or substantially unique NMK. For example, the NMK can be randomly generated. However, a randomly generated key may not be completely unique (e.g., the same key could be generated again. In some implementations, the NMK can be provided by the authorization server 470 to the headend 430.

In various implementations, the headend 430 forward the connection request 450 to the authorization server 470. The authorization server 470 can extract an identifier (e.g., a media access control (MAC) address) associated with the request 460 and identify a device access key (DAK) associated with the device. In various implementations, the authorization server 470 contains the MAC/DAK of devices authorized to access the network. For example, when a new device 400 is deployed, the MAC address associated with the device 400, along with the DAK associated with the device 400 can be stored at the authorization server 470. Such data can substitute for a username/password combination for the new device 400. The connection request can be decrypted using the DAK associated with the extracted MAC address. In such implementations, when the DAK associated with the MAC address of the device is operable to decrypt the connection request, the new NTU device 400 can be authorized to connect to the network. The authorization server 470 can notify the headend 430 that the new NTU can be authorized. The authorization server 470 can respond to the connection request by encrypting a network membership key (NMK) using the DAK associated with the new NTU 400. The new NTU 400 can thereby decrypt the NMK using it's own DAK. The authorization server 470 can also provide the NMK to the headend 430. The headend 430 can notify one or more repeaters 410a-c that the NTU device 400 is authorized to join the network. The NTU device 400 can then be associated with one or more repeater devices 410a-c. In some implementations, the NMK can be a unique or substantially unique NMK. For example, the NMK can be randomly generated. However, a randomly generated key may not be completely unique (e.g., the same key could be generated again.

In some aspects, the NMK can indicate membership in a sub-network. For example a NMK can indicate membership in the AV sub-cell illustrated in FIG. 1. Additionally, the NMK can indicate membership in a network of the BPL sub-cell illustrated in FIG. 1. The NMK can be assigned to an NTU coupled to the AV sub-cell or the BPL sub-cell to indicate that the NTU is a member of the AV sub-cell. An AV sub-cell can have a single NMK. Alternatively, an AV sub-cell can have more than one NMK for secure distribution of different NEKs. A central coordinator of a network can deploy multiple NEKs (possibly using multiple NMKs), thereby forming several logical subnetworks of the AV sub-cell. The NMK can be used by a station to prove its membership in an AV sub-cell (or a subnetwork of the AV sub-cell). For example, the NMK can prove a stations right to join (participate in) a network of the BPL sub-cell, an AV sub-cell or subnetwork of an AV sub-cell. Thus, the NMK can be used to define an AV sub-cell or subnetwork of an AV sub-cell. The NMK can be used to cryptographically isolate the subnetwork from other subnetworks having a different NMK. In some aspects, a 54bit network identifier for the subnetwork associated with the NMK can be generated based, at least in part, on the NMK. For example, a network identifier can be generated by hashing the NMK.

Figure 5:
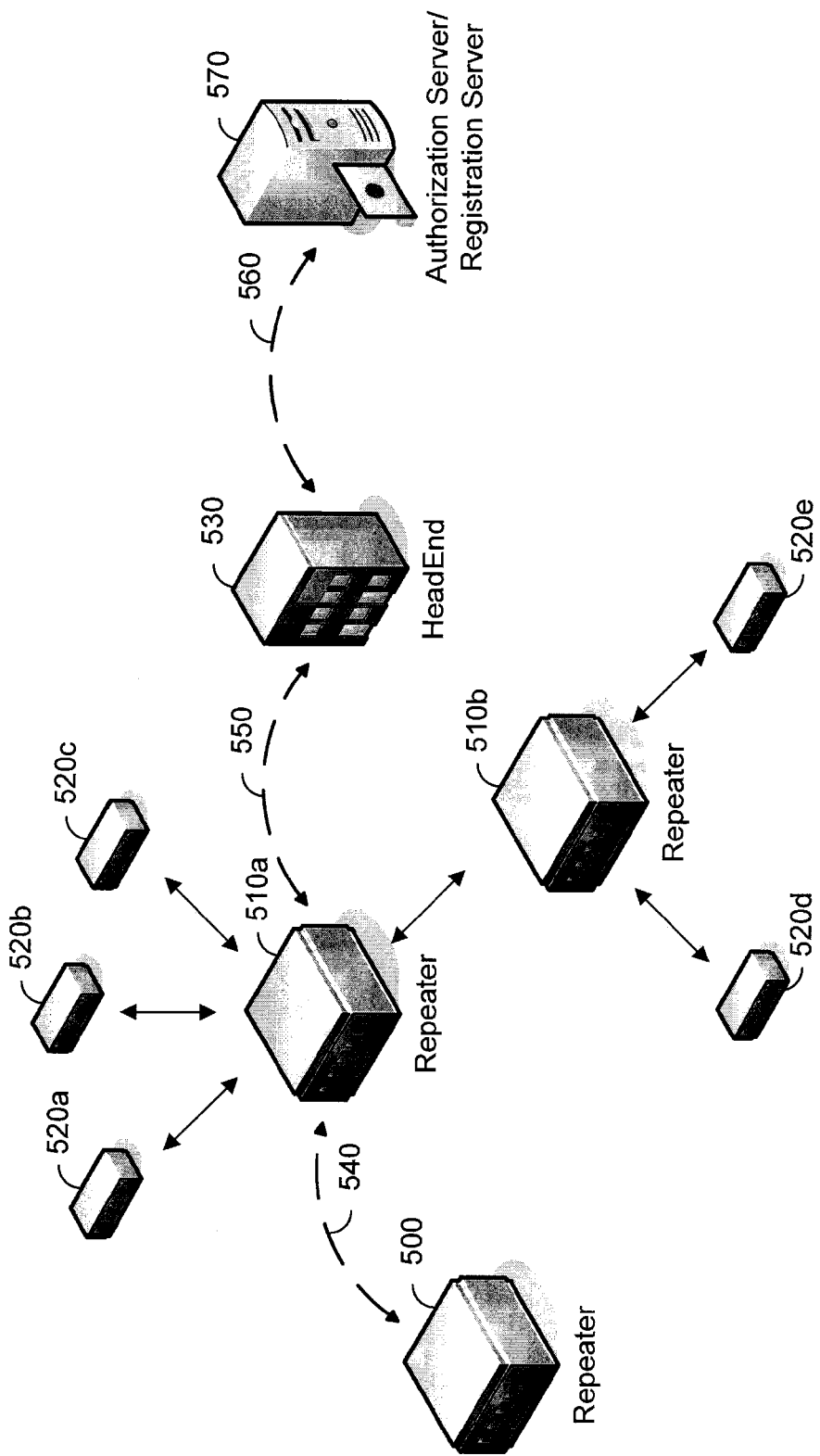
FIG. 5 is a block diagram illustrating a process for authorizing a new repeater into a network.

FIG. 5 is a block diagram illustrating a process for authorizing a new repeater 500 into a network. The network can include a number of existing repeaters 510a-b in communication with a number of network termination unit (NTU) devices 520a-e. The NTU device 520a-e can communicate with a headend 530 through the repeaters 510a-b. In various implementations, the repeaters 510a-b can operate to retransmit data signals on the line after degradation of the data signal over distances.

When a new repeater 500 attempts to join the network, it can send a connection request to any of the network devices (e.g., repeaters 510a-b, headend 530, etc.). In some examples, the new repeater 500 can send a connection request 540 to an existing repeater 510a. In various implementations, the existing repeater 510a can send a forwarded connection request 550 to the headend 530. In various implementations, the headend 530 can forward the connection request to the authorization server 570.

In various implementations, the authorization server 570 can authorize the forwarded connection request 550 based upon an encryption applied to the forwarded connection request 550 by the new repeater 500. For example, the authorization server 570 can extract an identifier (e.g., a unique or substantially unique identifier) associated with the new repeater 500. In various implementations, the identifier can include a MAC address associated with the new repeater 500. Other unique identifiers are possible. The MAC address can be used to determine the DAK associated with the new repeater 500. The authorization server 570 can then attempt to decrypt the forwarded connection request 560 using the DAK associated with the extracted MAC address. If the authorization server 570 can successfully decrypt the forwarded request 560, the new repeater 500 is authorized. The authorization server 570 can respond to the connection request by encrypting a network membership key (NMK) using the DAK associated with the new repeater 500. The new repeater 500 can thereby decrypt the NMK using it's own DAK. In some implementations, the NMK can be a unique or substantially unique NMK. For example, the NMK can be randomly generated. However, a randomly generated key may not be completely unique (e.g., the same key could be generated again.

In other implementations, the connection request 540 can be sent unencrypted. In such implementations, the authorization server 570 can extract an identifier (e.g., MAC address) from the connection request. The authorization server 570 can use the identifier to determine the DAK associated with the new repeater. The authorization server 570 can then communicate (e.g., securely) an NMK to the new repeater 500 by encrypting the NMK using the DAK associated with the new repeater 500. The new repeater 500 can then communicate with existing repeaters 510a-b using the NMK received from the headend device. The NMK communicated to the new repeater 500 can also be communicated to one or more of the existing repeaters 510a-b to enable the existing repeaters 510a-b to communicate with the new repeater 500.

In various implementations, the new repeater 500 can use its unique NMK to request of a network encryption key (NEK). In some of these implementations, the NEK is known to each of the repeaters 510a-b, NTUs 520a-e, headend(s) 530, and authorization server 570. The NEK can be supplied securely to the network devices using a substantially unique key (e.g., a substantially unique NMK) associated with the device.

Figure 6:
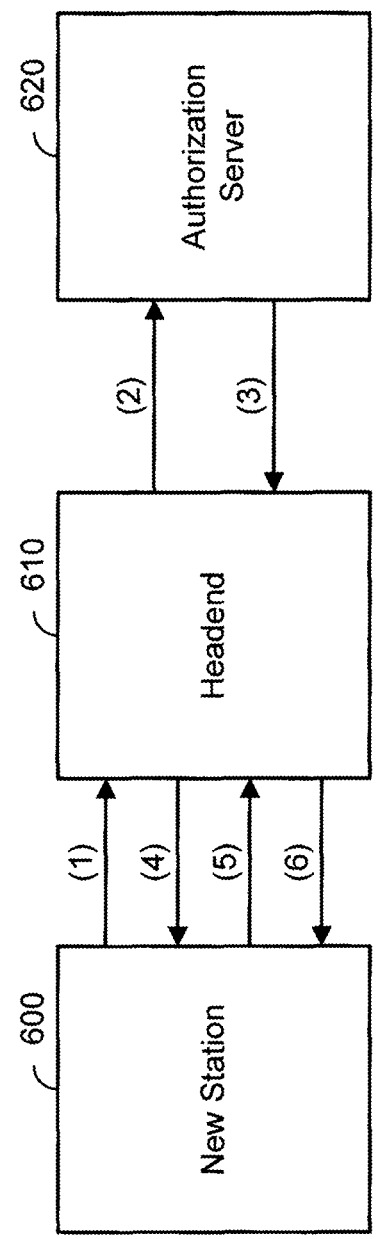
FIG. 6 is a block diagram illustrating the communication flow associated with authorizing a new station into a network.

FIG. 6 is a block diagram illustrating the communication flow associated with authorizing a new station into a network. When a new station 600 (e.g., an NTU, repeater, headend, etc.) joins the network, the new station 600 can transmit a connection request as shown by signal (1).

In various implementations, the connection request can be encrypted by the new station 600 using a device access key (DAK) associated with the new station 600. The connection request can be received by a headend/authorization server 610. The headend 610 can forward the connection request to the authorization server 620 as shown in (2). The authorization server 620 includes the identifiers associated with authorized devices and their corresponding DAKs.

The authorization server 620 can parse the connection request to extract an identifier associated with the new station 600. After extracting the identifier associated with the new station 600, the authorization server 620 can determine whether the identifier corresponds to an authorized device. If the identifier is recognized by the authorization server 620, authorization server 620 can used the corresponding DAK to decrypt the connection request received from the new station 600.

In various implementations, the authorization server 620 can authorize the new station 600 based upon being able to decrypt the connection request using the DAK associated with the new station 600. Upon authenticating the new station 600, the authorization server 620 can provide a network management key (NMK) to the new station 600 by send it to the headend 610, as shown by signal (3), which the passes it to the new station, as shown by signal (4). In some implementations, the NMK is unique or substantially unique to the device. The NMK can be randomly generated by authorization server 620.

In some implementations, upon receiving the NMK, the new station 600 can send a request to the headend 610 for a network encryption key (NEK) as shown by signal (5). In various implementations, the NEK can be used to encrypt communications among powerline network devices (e.g., NTUs, repeaters, headend(s), MAC/DAK data store, etc.). The NEK request can be encrypted using the NMK associated with the new station 600.

Upon receiving a request for the NEK, a headend 610 can authenticate the request by retrieving the NMK associated with the requesting station 600 from the authorization server 620, as shown by signals 2, 3. In some implementations, the authorization server can provide the NMK of all authorized stations to the headend. In such cases the headend can retrieve the NMK associated with the requesting station 600 from its local store instead of retrieving the NMK from the authorization server 620. The headend 610 attempting to decrypt the NEK request using the NMK associated with the requesting station 600. If the NMK associated with the requesting station 600 is operable to decrypt the NEK request, the headend 620 can encrypt the NEK using the NMK associated with the requesting station 600 and communicate the encrypted NEK to the requesting station 600 as shown by signal (6). The new station 600 can receive the encrypted NEK, and use the previously received NMK to decrypt the NEK. Upon decrypting the NEK, the new station 600 can encrypt communications to other network devices using the NEK.

Figure 7:
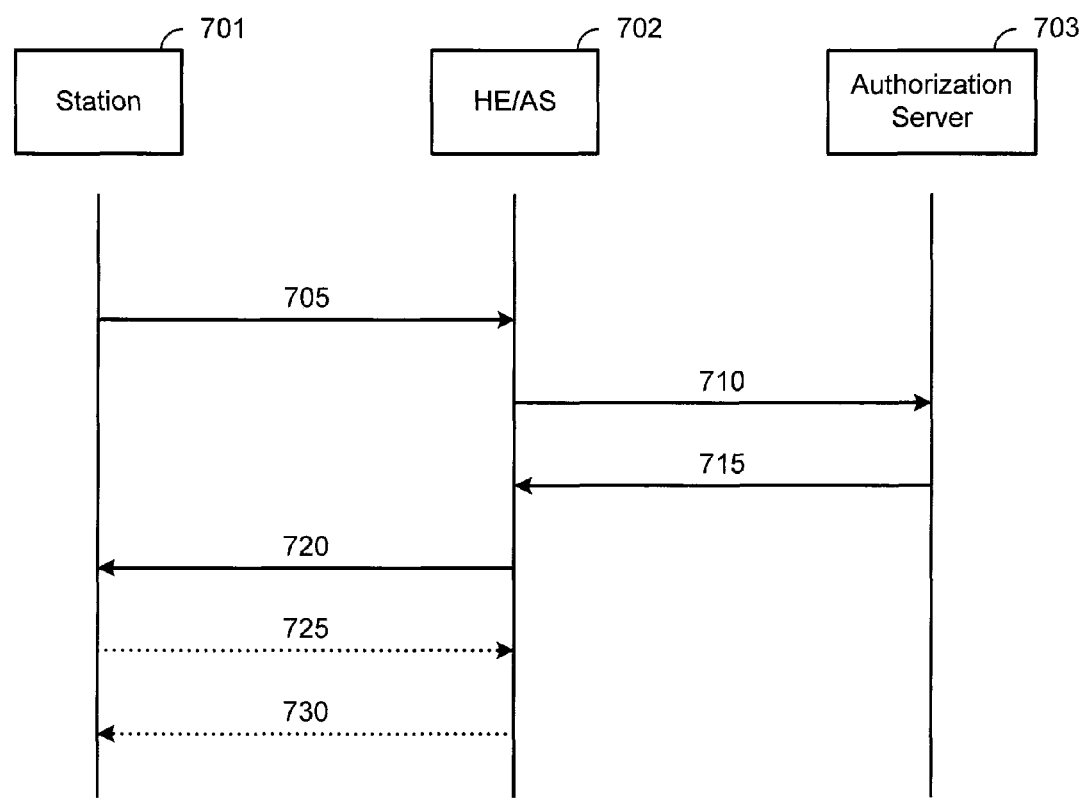
FIG. 7 is a flow diagram depicting an example flow for authorization of a station into a centrally managed network.

FIG. 7 is a flow diagram depicting an example flow for authorization of a STA into a centrally managed network. Stations in the centrally managed network can be authorized using a unique network membership key (NMK) associated with each of the stations. In some implementations, the unique NMK can be encrypted prior to distribution to each of the stations. Thus, each station might only include information about its own unique NMK, thereby safeguarding the unique NMKs for other devices and limiting the value of the information that can be obtained from a single NMK. The unique NMK can provide a mechanism to differentiate between stations in the event that a station is compromised by an intruder.

When a new station 701 joins the network, the station 701 requests to receive a unique network membership key from the HE 702, as shown by signal 705. The request can be encrypted using a device access key (DAK) associated with the station 701.

Upon receipt of the request, the HE can examine the request and locate a unique identifier, e.g., a media access control (MAC) address, associated with the request. The HE can query the authorization server 703 based upon the parsed MAC address as shown by signal 710. The authorization server 703 is configured to store MAC/DAK pairs. Approved stations can be entered into the MAC/DAK data store 703 prior to deployment of the station.

If the MAC address is valid, the authorization server 703 can return a DAK associated with the MAC address as shown by signal 715. The DAK can be used in an attempt to decrypt the request. If the decryption is successful, the request is authorized. Otherwise the request is not authorized and is ignored or rejected.

When the request is authorized, the HE 702 can use the DAK to encrypt a unique NMK associated with the station. In some implementations, the HE 702 can generate the unique NMK. In other implementations, the HE 702 can retrieve the unique NMK from the authorization server 703. The encrypted unique NMK can then be communicated to the station as shown by signal 720.

In optional implementations, the station can use the unique NMK to encrypt a request a network encryption key (NEK) as shown by signal 725. In such implementations, the NEK can be used to encrypt all communications among stations 701 in a core cell (e.g., core cell of FIG. 1). The HE 702 can authenticate the request by decrypting the request using the unique NMK. The HE 702 can provide the NEK based upon authenticating the request as shown by signal 730.

In some instances, the authorization server or headend might determine that a station has been compromised by an intruder or hacker. In such instances, the authorization server or headend can reset the NEK. When the NEK is reset, the headend can transmit the new NEK to any stations that have not been compromised. The new NEK can be encrypted using the unique NMKs associated with those stations that have not been compromised. Thus, those stations that have been compromised will not be able to decrypt the new NEK and the compromised station is thereby isolated from the remainder of the network.

The NEK can also be rotated to protect the network encryption key from cracking using brute force algorithms. In order to protect stations from illegitimate key rotations requests, headend or authorization server can provide a counter to the stations. In some implementations, the same counter can be provided to all stations. In other implementations, the counter can be a pseudo-random number that may differ between stations. In some implementations, the counter can be provided in an encrypted format, for example, using a network membership key associated with the station, or using a device access key associated with the station. In other implementations, the counter can be provided to the station with the first NEK, both the counter and the NEK being encrypted using the NMK associated with that device.

The counter can serve to test that a new NEK is authentic. In some implementations, a rotation message can be sent to the stations. The rotation message can include the new NEK and an incremented counter. In various implementations, the increment associated with the counter might not be linear, or might not be incremental, but rather the counter may be incremented according to some algorithm known to both the authorization server and the stations. The rotation message can be encrypted using the NMK associated with each respective station.

Upon receiving a rotation message, the stations can decrypt the message using the stations' respective NMKs. The station can compare the counter value included in the rotation message to its own counter value. If the counter values match, the new NEK is authenticated, and replaces the previous NEK.

FIG. 8 is a flowchart illustrating an example method to request a NMK for a station. At stage 800, an NMK request is communicated to an authorization server. The NMK request can be communicated, for example, by a station (e.g., NTU, RP, or HE of FIG. 1). In some implementations, the NMK request can be encrypted. The encryption can be performed by a station requesting the NMK, and can be encrypted using a device access key (DAK) associated with the requesting station.

At stage 810, an encrypted network membership key can be received. In various embodiments, the encrypted NMK can be received, for example, by a station (e.g., NTU, RP, HE of FIG. 1). In some implementations, the NMK can be encrypted using the DAK associated with the requesting station. The DAK associated with the requesting station can be identified, for example, by an authorization server using the unique identifier associated with the station (e.g., the MAC address). The NMK request is determined to be authentic based upon the DAK being operable to decrypt the NMK request.

At stage 820, the encrypted NMK can be decrypted. The encrypted NMK can be decrypted, for example, by a requesting station (e.g., NTU, RP, HE of FIG. 1). The NMK is encrypted using the DAK associated with the requesting station. The requesting station has knowledge of its own DAK and is therefore able to decrypt the encrypted NMK.

FIG. 9 is a flowchart illustrating an example method to provide a unique NMK to a station. At stage 900, an encrypted NMK request is received. The NMK request can be communicated, for example, by an authorization server (e.g., AS 470 of FIG. 4). In some implementations, the NMK request is encrypted using the DAK associated with a station requesting the NMK.

At stage 910, a MAC address associated with the requesting station is received. In various embodiments, the MAC address can be received, for example, by an authorization server (e.g., AS 470 of FIG. 4) as part of the encrypted NMK request. The MAC address associated with the requesting station can be transmitted without encryption.

At stage 920, the NMK request can be authorized. The NMK request can be authorized, for example, by a authorization server (e.g., AS 470 of FIG. 4). The request can be authenticated by retrieving a DAK associated with a unique identifier (e.g., a MAC address). If the DAK is operable to be used to decrypt the NMK request, the NMK request is considered to be authentic.

At stage 930, the NMK is encrypted based on authorization of the request. The NMK can be encrypted, for example, by an authorization server (e.g., AS 470 of FIG. 4). In some implementations, the NMK can be encrypted using the DAK associated with the requesting station.

At stage 940, the encrypted NMK is communicated to the requesting station. The encrypted NMK can be communicated, for example, by an authorization server (e.g., AS 470 of FIG. 4). The NMK can be communicated using a broadband over powerline network. Other communication mechanisms are possible.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

These and other implementations are within the scope of the following claims.

What is claimed is:

1. A method for authorizing a station, the method comprising:
   generating, by a first station, a network membership key request;
   communicating, via a first network, the network membership key request to an authorization server, the network membership key request including a unique identifier associated with the first station;
   receiving a network membership key based, at least in part, on the network membership key request, wherein the network membership key is received in a first encrypted format based, at least in part, upon a device access key, wherein the network membership key is utilized by the first station to indicate the first station is authorized to join or participate as a member of a sub-network coupled to the first network, wherein the sub-network comprises one of an AV sub-cell or a BPL sub-cell;
   communicating, by the first station, a network encryption key request, the network encryption key request encrypted utilizing the network membership key; and
   receiving a network encryption key in a second encrypted format, wherein the second encrypted format is based, at least in part, upon the network membership key.

2. The method of claim 1, wherein generating the network membership key request comprises encrypting the network membership key request using the device access key, the device access key being associated with the first station.

3. The method of claim 1, further comprising generating a network identifier based, at least in part, on the network membership key.

4. The method of claim 1, further comprising:
   determining that the first station has been compromised; and
   in response to determining that the first station has been compromised, communicating a new network encryption key to a second station that has not been compromised using a second network membership key associated with the second station.

5. The method of claim 1, wherein the unique identifier comprises a media access control address associated with the first station.

6. The method of claim 1, wherein the network membership key comprises a randomly generated network membership key.

7. The method of claim 1, further comprising
   receiving, at a subsequent time, a rotated network encryption key, wherein the rotated network encryption key is received in the second encrypted format.

8. The method of claim 1,
   wherein a plurality of stations receive the network encryption key in an encrypted format based, at least in part, on respective network membership keys associated with each of the plurality of stations, and wherein the first station communicates with the plurality of stations using the network encryption key.

9. The method of claim 1, further comprising:
   updating a previous counter value to determine an updated counter value;
   receiving a rotation message including a new network encryption key and a present counter value, wherein the rotation message is in the second encrypted format; and comparing the updated counter value to the present counter value to authenticate the new network encryption key.

10. The method of claim 9, further comprising:
replacing the network encryption key with the new network encryption key; and
utilizing the new network encryption key for communications with at least two other stations.

11. A method for authorizing a station, the method comprising:
receiving, via a first network, an encrypted network membership key request from a first station, wherein the encrypted network membership key request is associated with an unencrypted unique identifier;
determining whether the encrypted network membership key request is authentic based, at least in part, upon the unencrypted unique identifier;
encrypting a network membership key using a device access key associated with the first station, wherein the network membership key is utilized by the first station to indicate the first station is authorized to join or participate as a member of a sub-network coupled to the first network, wherein the sub-network comprises one of an AV sub-cell or a BPL sub-cell;
communicating the encrypted network membership key to the first station;
receiving a network encryption key request, the network encryption key request encrypted utilizing a key;
encrypting a network encryption key using the network membership key; and
communicating the encrypted network encryption key to the first station.

12. The method of claim 11, wherein determining whether the encrypted network membership key is authentic comprises:
identifying a stored device access key associated with the unencrypted unique identifier;
attempting to decrypt the encrypted network membership key request using the stored device access key; and
authenticating the encrypted network membership key request based, at least in part, on the attempt.

13. The method of claim 11, further comprising generating a network identifier based, at least in part, on the network membership key.

14. The method of claim 11, further comprising:
determining that the first station has been compromised; and
in response to determining that the first station has been compromised, communicating a new network encryption key to a second station that has not been compromised using a second network membership key associated with the second station.

15. The method of claim 11, further comprising:
in response to determining to send a new network encryption key to the first station,
encrypting a rotation message including the new network encryption key and a present counter value, wherein the rotation message is encrypted using the network membership key, and
communicating the encrypted rotation message to the first station, wherein the encrypted rotation message enables the first station to authenticate the new network encryption key based, at least in part, on comparing the present counter value to an updated counter value.

16. An authentication system comprising:
a processor; and
a storage medium comprising program instructions that, when executed by the processor, cause the authentication system to:
receive, from a first station via a first network, an encrypted network membership key request;
identify a device access key stored by the authentication system based, at least in part, on an unencrypted unique identifier associated with the encrypted network membership key request;
authenticate the first station based, at least in part, on utilizing the device access key to successfully decrypt the encrypted network membership key request;
encrypt a network membership key for the first station using the device access key, wherein the network membership key is utilized by the first station to indicate the first station is authorized to join or participate as a member of a sub-network coupled to the first network, wherein the sub-network comprises one of an AV sub-cell or a BPL sub-cell;
communicate the encrypted network membership key to the first station based, at least in part, on authenticating the first station;
receive a network encryption key request, the network encryption key request encrypted utilizing the network membership key;
encrypt a network encryption key using the network membership key; and
communicate the encrypted network encryption key to the first station.

17. The authentication system of claim 16, wherein the first station is a member of the group consisting of a headend unit, a repeater, and a network termination unit.

18. The authentication system of claim 16, further comprising generating a network identifier based, at least in part, on the network membership key.

19. The authentication system of claim 16, wherein the storage medium further comprises program instructions executable by the processor to cause the authentication system to:
rotate the network membership key.

20. The authentication system of claim 16, wherein the storage medium further comprises program instructions executable by the processor to cause the authentication system to:
rotate the network encryption key; and
communicate the rotated network encryption key to the first station.

21. The authentication system of claim 20,
wherein the storage medium further comprises program instructions executable by the processor to cause the authentication system to:
include an encrypted counter value with the rotated network encryption key; and
communicate a key rotation message to the first station;
wherein the first station determines whether the rotated network encryption key is authentic based, at least in part, on the encrypted counter value.

22. The authentication system of claim 21,
wherein a previous counter value is communicated to the first station prior to communication of the rotated network encryption key;
wherein the first station increments the previous counter value to a present counter value, and compares the present counter value to a value obtained after decrypting the encrypted counter value to authenticate the rotated network encryption key.

23. The authentication system of claim 16, wherein the storage medium further comprises program instructions executable by the processor to cause the authentication system to:

generate a new network encryption key in response to notification that a second station has been compromised; and communicate the new network encryption key to the first station using the network membership key.

24. The authentication system of claim 16, wherein the first network comprises a powerline network.

25. The authentication system of claim 16, wherein the storage medium further comprises program instructions executable by the processor to cause the authentication system to:

refuse connection to a station in response to determining that the device access key associated with the unencrypted unique identifier of an encrypted network membership key request does not match the device access key used to encrypt the encrypted network membership key request.

* * * * *